Feb. 4, 1930.  J. C. SCHMIDT  1,745,384
VIBRATING PICK FOR CLEANING AND TREATMENT OF THE SURFACES OF OBJECTS
Filed July 2, 1924
Fig. 1.
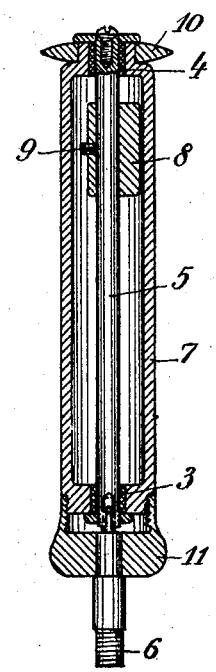
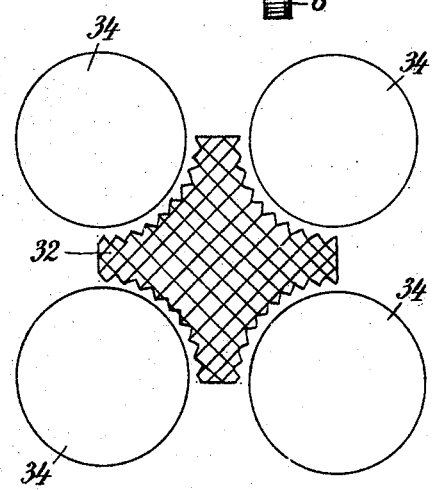
Fig. 3.
Fig. 2.
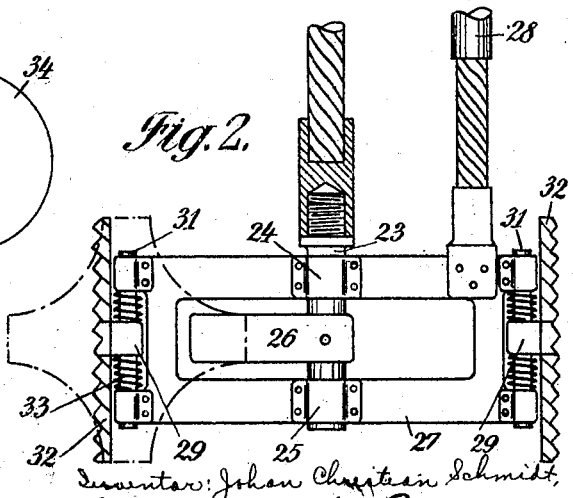
Inventor: Johan Christian Schmidt
By: [signature] attys.

Patented Feb. 4, 1930

1,745,384

UNITED STATES PATENT OFFICE

JOHAN CHRISTIAN SCHMIDT, OF COPENHAGEN, DENMARK

VIBRATING PICK FOR CLEANING AND TREATMENT OF THE SURFACES OF OBJECTS

Application filed July 2, 1924, Serial No. 723,848, and in Denmark July 6, 1923.

The present invention relates to a hammering tool or vibrating pick for cleaning and treatment of the surfaces of objects, in particular metallic surfaces such as the surfaces of steam boilers for scale, ships' hulls for rust and deposits, or for other similar purposes. The characteristic feature of the invention consists therein that the vibrating pick contains a rapidly revolving spindle, the center of gravity of which lies outside its axis of rotation so that violent vibrations will proceed from the said spindle which vibrations are transmitted to the surface to be treated, either directly by means of a tool attached to said spindle or indirectly by means of a tool which is fitted to the tube or the frame in which the revolving spindle is journalled. When the tool is fitted to the revolving spindle itself, it will participate in the revolution of the latter, but when it is arranged in connection with the frame or the like of the apparatus it will be stationary and be only affected by the vibrations proceeding from the sideheavy spindle.

In the accompanying drawing various constructional forms for carrying out the present invention are shown by way of example and described hereinafter in the following specification.

Fig. 1 is an apparatus with a revolving spindle which is journalled in a handle to which the tool proper is fitted.

Fig. 2 is an apparatus for cleaning the boiler tube plate and the outside of boiler tubes, in side view.

Fig. 3 is the same apparatus in end view, placed between a number of boiler tubes to be cleaned.

As shown in Fig. 1 a spindle 5 is journalled in the bearings 3 and 4, said spindle being connected by means of a flexible shaft 6 to a high-speed motor. The bearings 3 and 4 are disposed within a tube 7. The spindle 5 is made sideheavy by means of an eccentric weight 8 secured by a screw 9. When said screw 9 is loosened the weight 8 can be moved along the spindle 5 and be secured any where on the same. To the tube 7 is fitted a steel disc 10 sharpened along its edge, which, in the present form is the working tool proper. This disc is detachable and can be exchanged for another of a larger or smaller diameter or of a different shape, or, if desired for a chisel, or the like. To the tube 7 is fitted a handle 11.

When the spindle 5 is made to revolve rapidly, the weight 8 will cause violent vibrations to proceed from the said spindle. The tool 10 is then held with a slight pressure against the material to be treated, and the violent vibrations will be felt as quickly repeated blows by the tool 10 against the surface. The tool 10 will not only be subjected to vibrations in the directions towards and away from the surface to be treated, but also in lateral directions which, under certain conditions, can be of advantage.

In the apparatus shown in Figs. 2 and 3 the rapidly revolving spindle 23 is journalled in two bearings 24 and 25 and carries an eccentrically fitted weight 26. The bearings 24 and 25 are fitted to a frame 27 to which is attached a handle 28. At each end of the frame 27 is provided a pin 31, which, in the constructional form shown, is parallel to the spindle 23, and to this pin is fitted a tool 32 which, as shown in Fig. 3 has the shape of a cross. On the front side of this cross are provided grooves crossing each other, so that between the grooves sharp teeth are formed, and on the edges of the cross are notches rendering them similar to a coarse file. The cross is made of steel and hardened. On the back of the cross 32 is a lug 29 which encloses the pin 31.

The cross 32 is revolubly fitted on said pin 31, and is under the action of a spring 33, which tends to move the cross into the position shown in Fig. 2, in which the cross stands vertically to the plane of the paper. The cross may, however, be turned into the position indicated by dotted lines, in which it coincides with the plane of the frame 27, so that the apparatus can be inserted between the different boiler tubes disposed in groups parallel to each other. The spring 33 tends to hold the cross 32 in the position shown in Fig. 2, and will automatically return it into this position, when, for some reason or other it has been removed therefrom.

When the apparatus is to be used, the weight 26 is turned as shown in the Fig. 2 so that it lies within the plane of the frame 27, and the crosses 32 are turned into the position indicated by the dotted lines. In this position the apparatus is quite flat and may be easily inserted between the different boiler tubes. After the apparatus has reached the place where it shall operate the crosses 32 are released and these will then, under action of the springs 33 assume the position shown in Fig. 2. Now the spindle 23 is set into rapid revolution and violent vibrations will proceed therefrom which will via the frame 27 be transmitted to the crosses 32. The shape of these is adapted to the space between the individual boiler tubes, and when the apparatus is placed in such a manner that one of the crosses lies against the wall of the boiler, from which the boiler tubes extend, the scale deposited on this wall will be quickly picked off. When, thereafter by means of the handle 28 the apparatus is moved to and fro along the tubes, the edges of the crosses 32 will pick the surface of the latter, so that the scale will also be removed therefrom.

In Fig. 3 are shown four boiler tubes 34, and the size of the cross 32 is dimensioned according to the space between these. These four boiler tubes are arranged in a square but when they are disposed in a different position to each other, the tool 32 may, instead of the shape of a cross, be given any other suitable shape. After the spaces between a group of tubes has been cleaned, the cross is again turned into the plane with the frame 27 and the apparatus is inserted into another group of tubes, whereupon the cleaning is continued.

The spindle 23 should be coupled to the driving motor by a flexible shaft of such a length that the apparatus can without any difficulty, be moved about everywhere in the boiler and the cleaning work which with hitherto known apparatus was extremely difficult and expensive, can with the hereinbefore described apparatus be completed in a much more perfect degree than has ever been possible before.

The constructional forms of the apparatus shown in the drawings and herein described may be varied in many manners according to the purpose for which the apparatus is intended and the demands put to it. With the herein described apparatus it is furthermore rendered possible to clean the boiler tubes from above, which will be the most convenient method.

I claim:

A vibrating pick for cleaning and treatment of surfaces consisting of a frame, a rapidly revolving spindle journalled in said frame, a weight eccentrically fitted to said spindle, a pick tool fitted to each end of said frame, said pick tools swivelling on hinges mounted on said frame and springs adapted to swing said tools into operating position at right angles to the surface of said frame.

In witness whereof he affixes his signature.

JOHAN CHRISTIAN SCHMIDT.